(12) United States Patent
    Cheng (10) Patent No.: US 10,833,420 B2
(45) Date of Patent: *Nov. 10, 2020

(54) ANTENNA DEVICE AND ANTENNA SYSTEM (71) Applicant: DELTA ELECTRONICS, INC., Taoyuan (TW)

(72) Inventor: Kuang-Kai Cheng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/874,054

(22) Filed: May 14, 2020

(65) Prior Publication Data
US 2020/0274249 A1 Aug. 27, 2020

Related U.S. Application Data (63) Continuation of application No. 16/009,525, filed on Jun. 15, 2018.

(30) Foreign Application Priority Data

Jan. 5, 2018 (CN) .......................... 2018 1 0009305

(51) Int. Cl.
    H01Q 21/20    (2006.01)
    H01Q 19/18    (2006.01)
    H01Q 3/24     (2006.01)
    H01Q 19/02    (2006.01)
(Continued)

(52) U.S. Cl.
    CPC ............. *H01Q 19/18* (2013.01); *H01Q 3/242* (2013.01); *H01Q 19/021* (2013.01); *H01Q 21/20* (2013.01); *H01Q 9/40* (2013.01); *H04B 1/1081* (2013.01)

(58) Field of Classification Search
    CPC ...... H01Q 19/18; H01Q 19/021; H01Q 21/20; H01Q 3/242; H01Q 9/40; H04B 1/1081
    See application file for complete search history.

(56) References Cited

U.S. PATENT DOCUMENTS

| 5,231,413 A | 7/1993 | Dubois |
| 5,661,494 A | 8/1997 | Bondyopadhyay |
| 9,263,798 B1 | 2/2016 | Piazza et al. |

(Continued)

FOREIGN PATENT DOCUMENTS

| CN | 105552575 | 5/2016 |
| JP | 10200323  | 7/1998 |

(Continued)

Primary Examiner — Awat M Salih
(74) Attorney, Agent, or Firm — Hauptman Ham, LLP (57) ABSTRACT An antenna device includes an antenna unit and reflecting units. The antenna unit is arranged on a substrate. The reflecting units are arranged separately from each other on the substrate and surrounding the antenna unit. The reflecting units are configured to adjust a radiation pattern of the antenna unit, and each of the reflecting units includes a first portion and a second portion. The first portion has an upper side and a lower side, and the lower side of the first portion is coupled to the substrate. The second portion has a lower side connected to the upper side of the first portion. A width of the lower side of the first portion is smaller than a width of the lower side of the second portion.

9 Claims, 5 Drawing Sheets (51) Int. Cl.
*H01Q 9/40* (2006.01)
*H04B 1/10* (2006.01)

(56) References Cited

U.S. PATENT DOCUMENTS

| | | |
|---|---|---|
| 9,543,648 B2 | 1/2017 | Chang et al. |
| 2003/0184492 A1 | 10/2003 | Chiang et al. |
| 2003/0193446 A1 | 10/2003 | Chen |
| 2006/0164320 A1 | 7/2006 | Lastinger et al. |
| 2007/0152903 A1 | 7/2007 | Lin et al. |
| 2009/0040127 A1 | 2/2009 | Williams |
| 2014/0285387 A1 | 9/2014 | Lindenmeier et al. |
| 2015/0078488 A1 | 3/2015 | Lee et al. |
| 2015/0288064 A1* | 10/2015 | Su .................. H01Q 21/205 342/374 |
| 2016/0240910 A1 | 8/2016 | Balter et al. |
| 2016/0302081 A1 | 10/2016 | Liu et al. |
| 2017/0222318 A1 | 8/2017 | Li et al. |
| 2018/0175515 A1 | 6/2018 | Boutayeb |
| 2019/0131720 A1* | 5/2019 | Yu .................. H01Q 21/205 |

FOREIGN PATENT DOCUMENTS

| | | |
|---|---|---|
| TW | I508374 | 11/2015 |
| TW | 201637286 | 10/2016 |

* cited by examiner

ANTENNA DEVICE AND ANTENNA SYSTEM

RELATED APPLICATIONS

This application is a continuation of U.S. application Ser. No. 16/009,525, filed Jun. 15, 2018, which claims priority to China Application Serial Number 201810009305.7, filed Jan. 5, 2018, all of which are herein incorporated by reference.

BACKGROUND

Technical Field

The present disclosure relates to an antenna device. More particularly, the present disclosure relates to a beam switching antenna device.

Description of Related Art

With the rapid development of wireless communication technology, the spectrum utilization with high efficiency has become increasingly important. In order to improve the utilization of the spectrum, a conventional method generates a complimentary radiation pattern by using uses spatial diversity, so as to obtain a diversity gain to reduce the influence of multipath fading on a wireless channel.

However, a large amount of antennas are required for generating an omni-directional radiation pattern by using the spatial diversity, and the locations and the sizes of the antennas have be to be taken into consideration to compensate radiation patterns.

Therefore, how to design an omni-directional antenna system with smaller space requirement and low cost is an important object nowadays.

SUMMARY

The disclosure provides an embodiment of an antenna device including an antenna unit and reflecting units. The antenna unit is arranged on a substrate. The reflecting units are arranged separately from each other on the substrate and surround the antenna unit. The reflecting units are configured to adjust a radiation pattern of the antenna unit, and each of the reflecting units includes a first portion and a second portion. The first portion has an upper side and a lower side, and the lower side of the first portion is coupled to the substrate. The second portion has a lower side connected to the upper side of the first portion. A width of the lower side of the first portion is smaller than a width of the lower side of the second portion.

The disclosure further provides an embodiment of an antenna system which includes a control circuit and antenna devices. The control circuit is configured to control corresponding radiation patterns of the antenna devices. The antenna devices are coupled to the control circuit, and each of the antenna devices includes reflecting units and an antenna unit surrounded by the reflecting units. Each of the reflecting units includes a connecting portion and a radiation pattern adjusting board. The connecting portion has a first side and a second side opposite to the first side, and the first side of the connecting portion is coupled to a substrate. The radiation pattern adjusting board has a first side and a second side opposite to the first side, and the first side of the radiation pattern adjusting board is connected to the second side of the connecting portion, in which a width of the first side of the connecting portion is smaller than a width of the first side of the radiation pattern adjusting board.

BRIEF DESCRIPTION OF THE DRAWINGS

The disclosure can be more fully understood by reading the following detailed description of the embodiment, with reference made to the accompanying drawings as follows.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
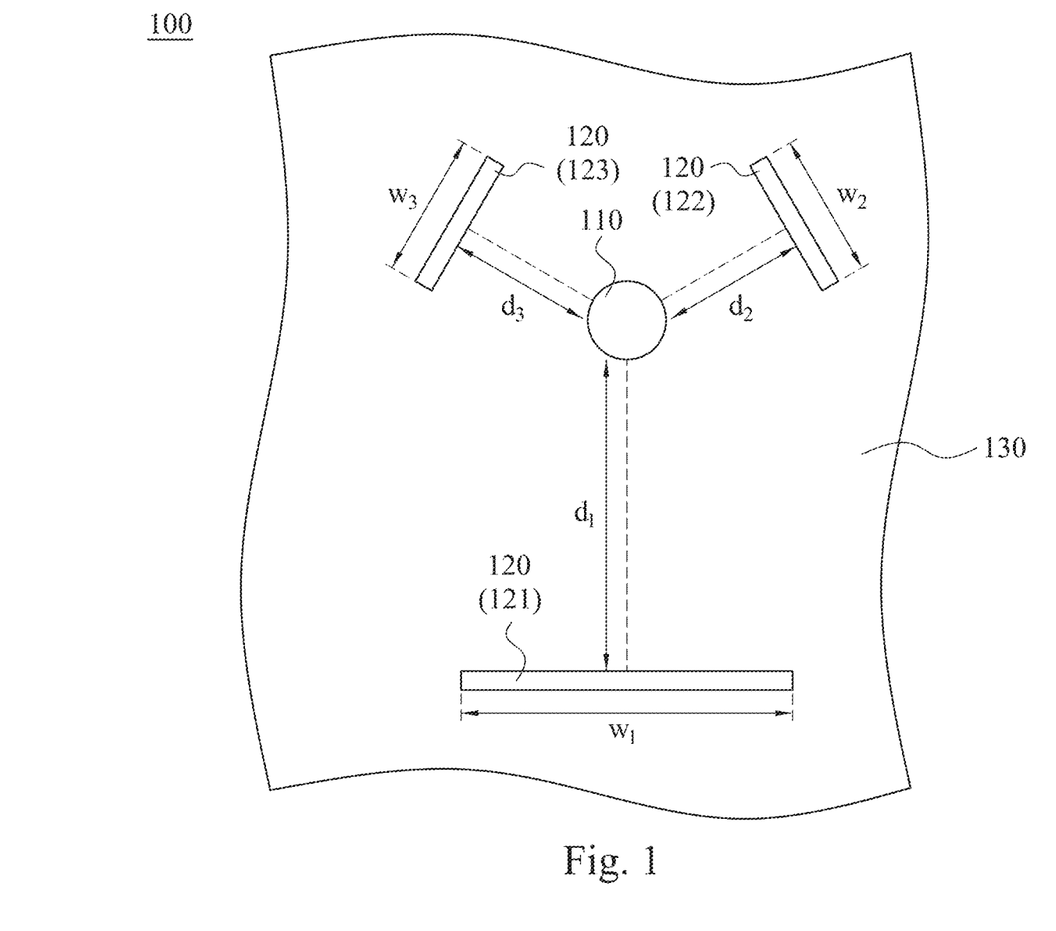
FIG. 1 is a schematic diagram illustrating an antenna device according to some embodiments of this disclosure.

FIG. 1 is a schematic diagram illustrating an antenna device 100 according to some embodiments of this disclosure. In some embodiments, the antenna device 100 is a smart beam switching antenna device, which can adjust reflecting units 120 of the antenna device 100 according to the location of a target signal source (not shown), thereby allowing the target signal source (not shown) to receive a signal with a greater strength.

As shown in FIG. 1, in some embodiments, the antenna device 100 includes an antenna unit 110, the reflecting units 120 and a substrate 130, where the antenna unit 110 and the reflecting units 120 are arranged on the substrate 130, and the reflecting units 120 are arranged around the antenna unit 110.

In some embodiments, the antenna unit 110 is used to receive or transmit a wireless signal to generate an outgoing radiation pattern. In some embodiments, the antenna unit 110 is a single-band antenna, in which the single band includes, but not limited to, 2.4 GHz or 5 GHz. The antenna unit 110 with any frequency is within the scope of the present disclosure. In some embodiments, the antenna unit 110 may be realized by, but not limited to, a planar inverted F antenna (PIFA), a dipole antenna or a loop antenna. Any circuit element suitable for implementing the antenna unit 110 is within the scope of the present disclosure.

In some embodiments, the reflecting unit 120 is used to adjust the radiation pattern of the antenna unit 110, and makes the radiation pattern generated by the antenna unit 110 directional. In some embodiments, the reflecting unit 120 may be realized by, but not limited to, connecting a thin metal line to a metal board. Any metal element which can be used to adjust the radiation pattern of the antenna unit 110 is within the scope of the present disclosure.

In some embodiments, the reflecting unit 120 includes reflecting units 121, 122, and 123 which are disposed around the antenna unit 110 as a center, such as shown in FIG. 1. For example, the angle between any of the reflecting units 120 and the antenna unit 110 is 120 degrees. In some embodiments, a width $w_1$ of the reflecting unit 121 (defined as the first reflecting unit) is, but not limited to, 0.33 times of a wavelength, a width $w_2$ of the reflecting unit 122 is, but not limited to, 0.266 times of the wavelength, and a width $w_3$ of the reflecting unit 123 is, but not limited to, 0.266 times of the wavelength, where the width of the first reflecting unit is the largest one. Each of the width $w_1$ of the reflecting unit 121, the width $w_2$ of the reflecting unit 122 and the width $w_3$ of the reflecting unit 123 is in a range from 0.1 times of the wavelength to 0.4 times of the wavelength is within the scope of the present disclosure. In some embodiments, the wavelength is the length of wave which is generated by the antenna unit 110 for the wireless transmission.

In some embodiments, the antenna unit 110 is arranged on a perpendicular bisector of an edge of an isosceles triangle formed by the reflecting units 121, 122 and 123, in which the perpendicular bisector is, but not limited to, perpendicular to the line between the reflecting unit 122 and the reflecting unit 123. Any position of the antenna unit 110 arranged in the triangle formed by the reflecting units 121, 122 and 123 is within the scope of the present disclosure.

In some embodiments, a distance $d_1$ between the reflecting unit 121 (i.e., the first reflecting unit) and the antenna unit 110 is, but not limited to, 0.27 times of the wavelength, a distance $d_2$ between the reflecting unit 122 and the antenna unit 110 is, but not limited to, 0.22 times of the wavelength, and a distance $d_3$ between the reflecting unit 123 and the antenna unit 110 is, but not limited to, 0.22 times of the wavelength. Each distance between the reflecting units 121-123 and the antenna unit 110, within a range from 0.2 times of the wavelength to 0.3 times of the wavelength, is within the scope of the present disclosure. In practical applications, when the frequency of the antenna unit 110 is 2.4 GHz, the distance $d_1$ between the reflecting unit 121 and the antenna unit 110, the distance $d_2$ between the reflecting unit 122 and the antenna unit 110, and the distance $d_3$ between the reflecting unit 123 and the antenna unit 110 are from 25 millimeters to 37 millimeters. In further embodiments, the distance $d_1$ between the reflecting unit 121 and the antenna unit 110 may be 34 millimeters, and both the distance $d_2$ between the reflecting unit 122 and the antenna unit 110 and the distance $d_3$ between the reflecting unit 123 and the antenna unit 110 may be 25 millimeters. When the frequency of the antenna unit 110 is 5 GHz, the distance $d_1$ between the reflecting unit 121 and the antenna unit 110, the distance $d_2$ between the reflecting unit 122 and the antenna unit 110, and the distance $d_3$ between the reflecting unit 123 and the antenna unit 110 are in a range from 12 millimeters to 18 millimeters. In further embodiments, the distance $d_1$ between the reflecting unit 121 and the antenna unit 110 may be 16 millimeters, and both the distance $d_2$ between the reflecting unit 122 and the antenna unit 110 and the distance $d_3$ between the reflecting unit 123 and the antenna unit 110 may be 13 millimeters.

As shown in the aforementioned embodiments, the width $w_1$ of the reflecting unit 121 (i.e., the first reflecting unit) is the largest one of the widths $w_1$, $w_2$, and $w_3$ of the reflecting units 121, 122, and 123, and the distance $d_1$ between the antenna unit 110 and the reflecting unit 121 is the largest one of the distances $d_1$, $d_2$, and $d_3$. In detail, the aforementioned designs are used to prevent the radiation pattern generated by the antenna unit 110, the reflecting units 122, and the reflecting unit 123 from being affected by the reflecting unit 121.

In some embodiments, the antenna device 100 adjusts the radiation pattern by connecting at least one of the reflecting units 121, 122, and 123 to the substrate 130. For example, when the reflecting unit 121 is connected to the substrate 130, the antenna device 100 generates a wave beam (not shown) transmitted upward to the top of FIG. 1. When the reflecting unit 122 and the reflecting unit 123 are both connected to the substrate 130, the antenna device 100 generates a wave beam (not shown) that is transmitted downward to the bottom of FIG. 1.

Figure 2A:
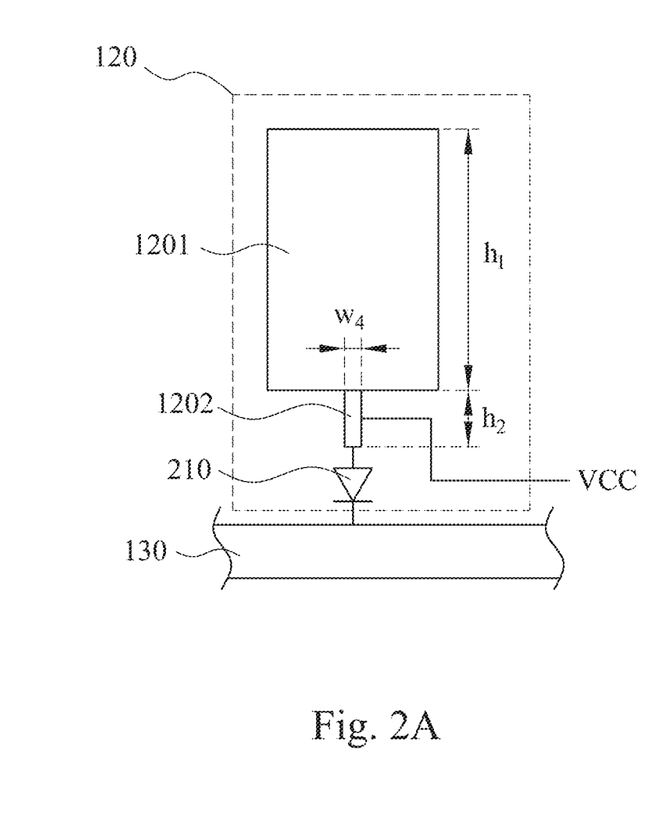
FIG. 2A is a schematic diagram illustrating a reflecting unit of an antenna device according to some embodiments of this disclosure.

FIG. 2A is a schematic diagram illustrating the reflecting unit 120 of the antenna device 100 according to some embodiments of this disclosure. As shown in FIG. 2A, in some embodiments, the reflecting unit 120 includes a first portion (not shown) and a second portion (not shown), where the first portion (not shown) is connected the second portion (not shown). In some embodiments, the first portion (not shown) includes a connecting portion 1202 shown in FIG. 2A and a connecting portion 1204 shown in FIGS. 2B, 2C and 2D, and the second portion (not shown) includes a radiation pattern adjusting board 1201 shown in FIG. 2A and a radiation pattern adjusting board 1203 shown in FIGS. 2B, 2C and 2D. For ease of understanding, the embodiments of the present disclosure described below are described by using the radiation pattern adjusting boards 1201 and 1203 and the connecting portions 1202 and 1204 as examples. As shown in FIG. 2A, the radiation pattern adjusting board 1201 engages with the connecting portion 1202, and the connecting portion 1202 is coupled to the substrate 130 via a switch 210.

In some embodiments, the switch 210 is used to connect or disconnect the reflecting unit 120 and the substrate 130. In some embodiments, the switch 210 may be, but not limited to, realized by a diode. Various electronic components that can be used to connect or disconnect the reflecting unit 120 and the substrate 130 are within the scope of the present disclosure.

In some embodiments, the radiation pattern adjusting board 1201 is used to adjust the radiation pattern of the antenna unit 110, the connecting portion 1202 is coupled to a power supply voltage VCC, and the connecting portion 1202 is used to separate the radiation pattern adjusting board 1201 and the substrate 130 by a given distance. In some embodiments, the radiation pattern adjusting board 1201 is a rectangular metal board, and the connecting portion 1202 is a thin metal strip. In some embodiments, the sum of the length $h_2$ of the connecting portion 1202 and the length of the switch 210 (i.e., the length from the lower side of the radiation pattern adjusting board 1201 to the substrate 130) is, but not limited to, 0.06-0.2 times of the wavelength, and the sum of the radiation pattern adjusting board 1201, the connecting portion 1202 and the switch 210 is, but not limited to, 0.3-0.6 times of the wavelength. Any value of the length $h_2$ of the connecting portion 1202 and the length of the switch 210, and the sum of the radiation pattern adjusting board 1201, the connecting portion 1202 and the switch 210 are within the scope of the present disclosure. In some embodiments, the width $w_4$ of the connecting portion 1202 is, but not limited to, 2 millimeters. Any value of the width $w_4$ smaller than 0.0625 times of the wavelength is within the scope of the present disclosure.

In practical applications, if the length between the lower side of the radiation pattern adjusting board 1201 and the substrate 130 is too small, the conduction efficiency of the switch 210 will be deteriorated. That is because even if the switch 210 is turned off, the radiation pattern adjusting board 1201 may still be grounded due to being too close to the substrate 130. By comparison, if the distance between the lower side of the radiation pattern adjusting board 1201 and the substrate 130 is too large, the directivity of the antenna device 100 will be insufficient.

Figure 2B:
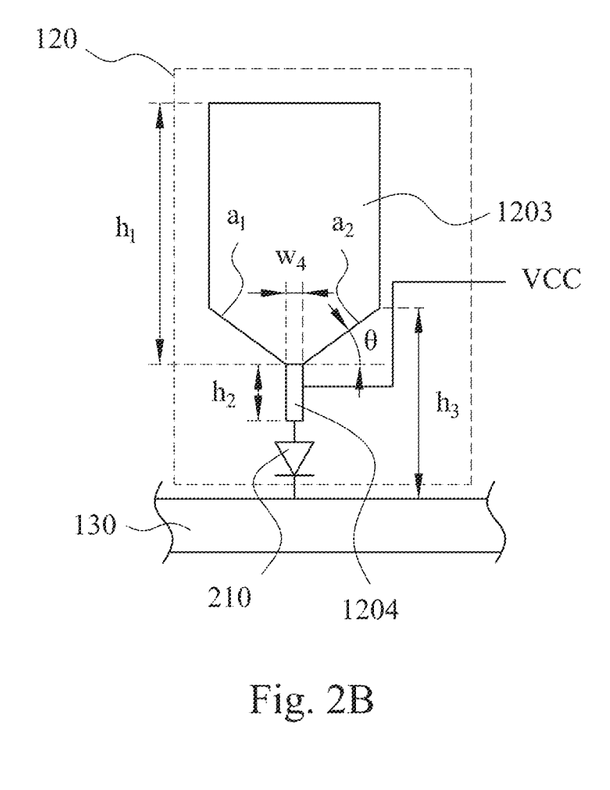
FIG. 2B is a schematic diagram illustrating a reflecting unit of an antenna device according to some embodiments of this disclosure.

FIG. 2B is a schematic diagram illustrating the reflecting unit 120 of the antenna device 100 according to some embodiments of this disclosure. As shown in FIG. 2B, in some embodiments, the reflecting unit 120 includes the radiation pattern adjusting board 1203 and the connecting portion 1204, in which the radiation pattern adjusting board 1203 engages with the connecting portion 1204, and the connecting portion 1204 is coupled to the substrate 130 via the switch 210.

In some embodiments, the function of the radiation pattern adjusting board 1203 is the same as that of the radiation pattern adjusting board 1201. In practical applications, the change of the shape of the radiation pattern between the radiation pattern adjusting board 1203 and the radiation pattern adjusting board 1201 broadens the bandwidth of the corresponding radiation pattern of the antenna device 100.

In some embodiments, as shown in FIG. 2B, the lower side of the radiation pattern adjusting board 1203 includes a first sub-side $a_1$ and a second sub-side $a_2$, in which the first sub-side $a_1$ and the second sub-side $a_2$ are, but not limited to, two straight lines; meanwhile, each of the first sub-side $a_1$ and the second sub-side $a_2$ and an extension line of an upper side (not shown) of the connecting portion 1204 forms an angle (such as the angle θ shown in FIG. 2B). The first sub-side $a_1$ and the second sub-side $a_2$ may be arcs, parabolas, or any other curved lines.

In some embodiments, as shown in FIG. 2B, the connecting portion 1204 is coupled to the power supply voltage VCC, and is used to separate the radiation pattern adjusting board 1203 and the substrate 130 by a given distance. In some embodiments, as shown in FIG. 2B, the height of the connecting portion 1204 is the length $h_2$, and the longest distance between the lower side of the radiation pattern adjusting board 1203 and the substrate 130 is the length $h_3$. The sum of the length $h_2$ and the length of the switch 210 (i.e., the distance from the lower side of the radiation pattern adjusting board 1203 to the substrate 130) is, but not limited to, 0.06-0.2 times of the wavelength, and the sum of the length $h_2$ and the length of the switch 210 is, but not limited to, 0.25-0.5 times of the length $h_3$. Any length of the length $h_3$ is within the scope of the present disclosure. In some embodiments, the width $w_4$ of the connecting portion 1204 is, but not limited to, 2 millimeters. Any length of the width $w_4$ smaller than 0.0625 times of the wavelength is within the scope of the present disclosure.

Figure 2C:
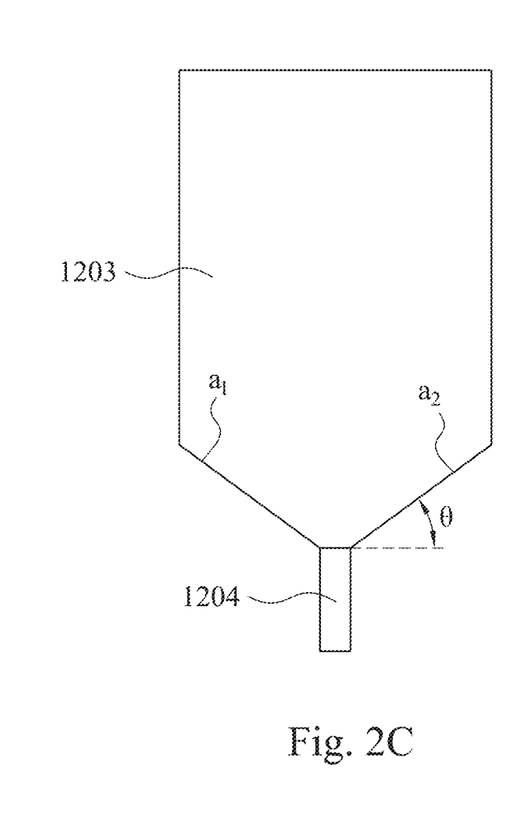
FIG. 2C is a partially enlarged schematic diagram of a reflecting unit of an antenna device according to some embodiments of FIG. 2B of this disclosure.

FIG. 2C is a partially enlarged schematic diagram of the reflecting unit 120 of the antenna device 100 according to some embodiments of FIG. 2B of this disclosure. In some embodiments, as shown in FIG. 2C, the first sub-side $a_1$ of the radiation pattern adjusting board 1203 and an extension line of an upper side of the connecting portion 1204 form an angle θ, and the second sub-side $a_2$ of the radiation pattern adjusting board 1203 and an extension line of an upper side of the connecting portion 1204 form an angle θ. In some embodiments, the angle θ is in a range, but not limited to, from 30 degrees to 60 degrees. Various ranges of the angle θ are within the scope of the present disclosure.

Figure 2D:
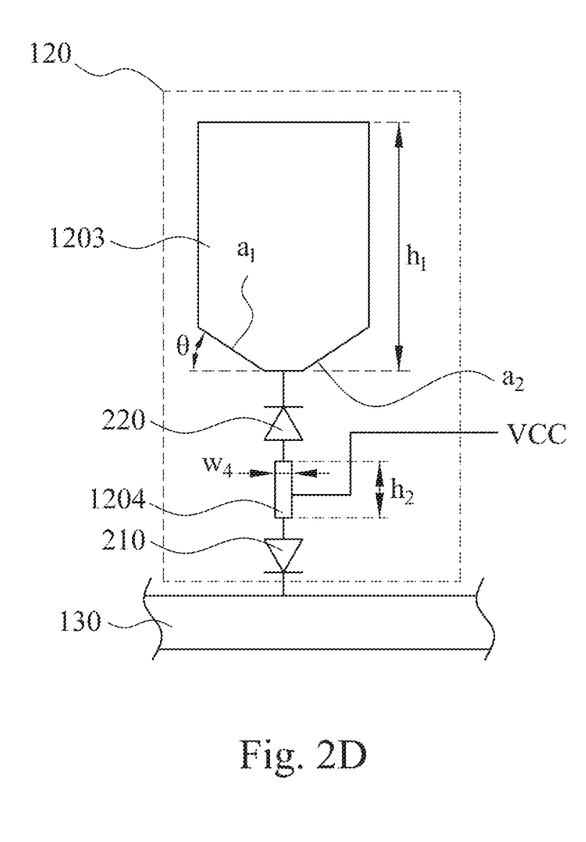
FIG. 2D is a schematic diagram illustrating a reflecting unit of an antenna device according to some embodiments of this disclosure.

FIG. 2D is a schematic diagram illustrating the reflecting unit 120 of the antenna device 100 according to some embodiments of this disclosure. As shown in FIG. 2D, in some embodiments, in addition to the radiation pattern adjusting board 1203, the connecting portion 1204, and the switch 210, the reflecting unit 120 further includes a switch 220, and the radiation pattern adjusting board 1203 is coupled to the connecting portion 1204 via the switch 220. Compared with the reflecting unit 120 in FIG. 2B, the switch 220 is added in this embodiment to completely isolate the reflecting unit 120 from the substrate 130 when the reflecting unit 120 of the antenna device 100 is disabled (i.e., the switch 210 is turned off).

In some embodiments, the shape and the size of the radiation pattern adjusting board 1203 and those of the connecting portion 1204 of the reflecting unit 120 in FIG. 2D are the same. In some embodiments, the sum of the length $h_2$ of the connecting portion 1204, lengths of the switch 210 and the switch 220 (i.e., the length from the lower side of the radiation pattern adjusting board 1203 to the substrate 130) is 0.06-0.2 times of the wavelength.

Figure 3:
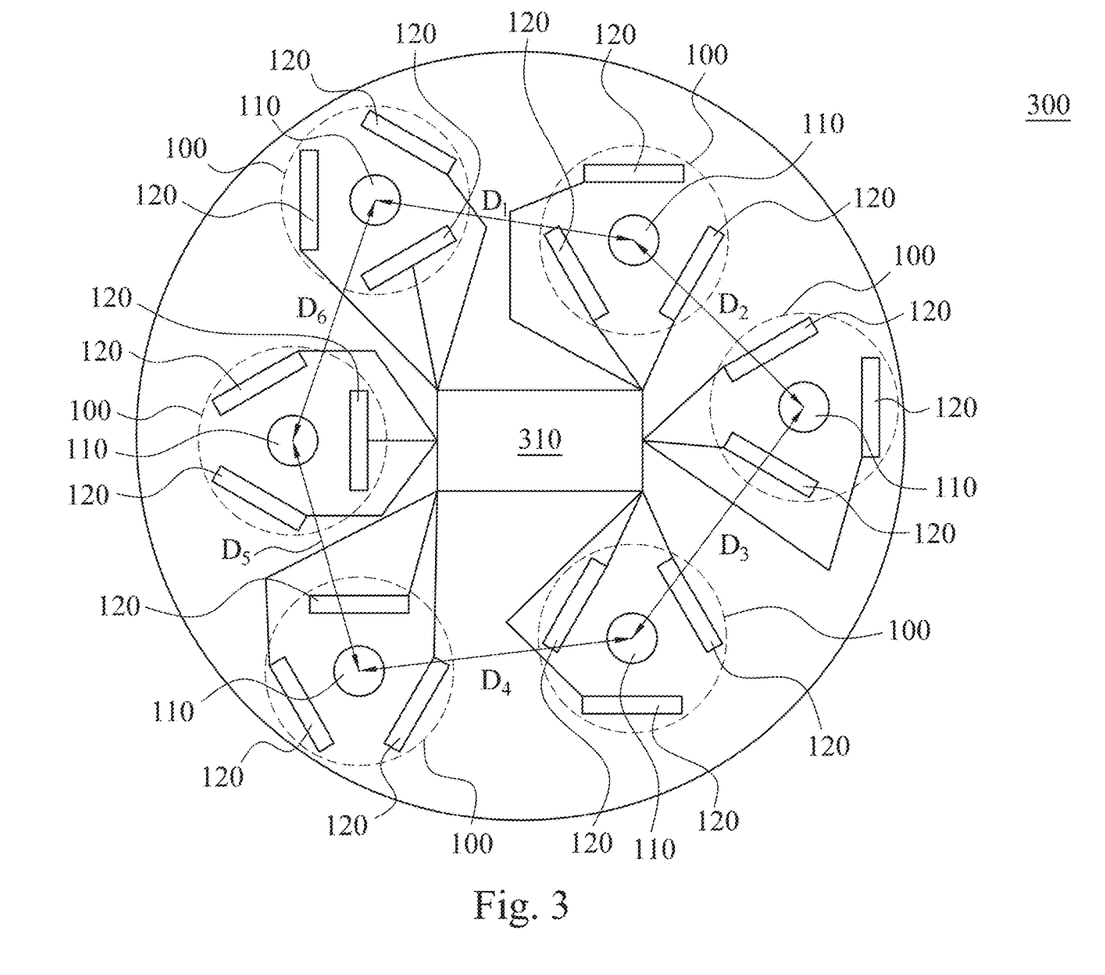
FIG. 3 is a schematic diagram illustrating an antenna system including the antenna devices illustrated in FIG. 1 according to some embodiments of this disclosure.

FIG. 3 is a schematic diagram illustrating an antenna system 300 including plural antenna devices 100 illustrated in FIG. 1 according to some embodiments of this disclosure. As shown in FIG. 3, the antenna system 300 includes a number of antenna devices 100 and a control circuit 310, in which the control circuit 310 is coupled to the reflecting units 120 of the antenna devices 100. As shown in FIG. 3, in some embodiments, the distances between any two adjacent antenna devices 100 are distances $D_1$-$D_6$, in which each of the distances $D_1$-$D_6$ is in a range from 1.3 times of the wavelength to 1.8 times of the wavelength. In some embodiments, if the antenna system 300 includes N antenna devices 100, every two adjacent antenna devices 100 are arranged at an angle of approximately 360°/N in the antenna system 300 respectively, in order to keep the isolations between the antenna devices 100 meeting the design requirements.

In some embodiments, the control circuit 310 is used to control the switches 210 and 220 of each of the antenna device 100 according to different situations, so as to control at least one of the reflecting units 120 of each of the antenna devices 100 to be connected to the substrate 130, such that the reflecting unit 120 connected to the substrate 130 adjusts and directs the radiation pattern generated by the antenna unit 110 to the target signal source (not shown) accordingly. In practical applications, when the target signal source (not shown) is located at a different direction, the antenna system 300 may provide a voltage drop through a control chip of the control circuit 310, so as to control to turn on or off the switches 210 and the switches 220 corresponding to the reflecting units 120 of each of the antenna device 100, so as to switch radiation patterns to different directivities of the antenna device 100, such that the antenna system 300 may receive and transmit the highest energy. In some embodiments, the control circuit 310 may further control at least one of the reflecting units 120 of few antenna devices 100 in the antenna system 300 that are located closer to the target signal source (not shown) according to actual requirements, such that the few antenna devices 100 can communicate with the target signal source (not shown).

In some embodiments, the control circuit 310 can be realized by, but not limited to, an integrated circuit (IC). Various electronic components that can use to control to turn on or off the switches 210 and 220 are within the scope of the present disclosure.

Figure 4:
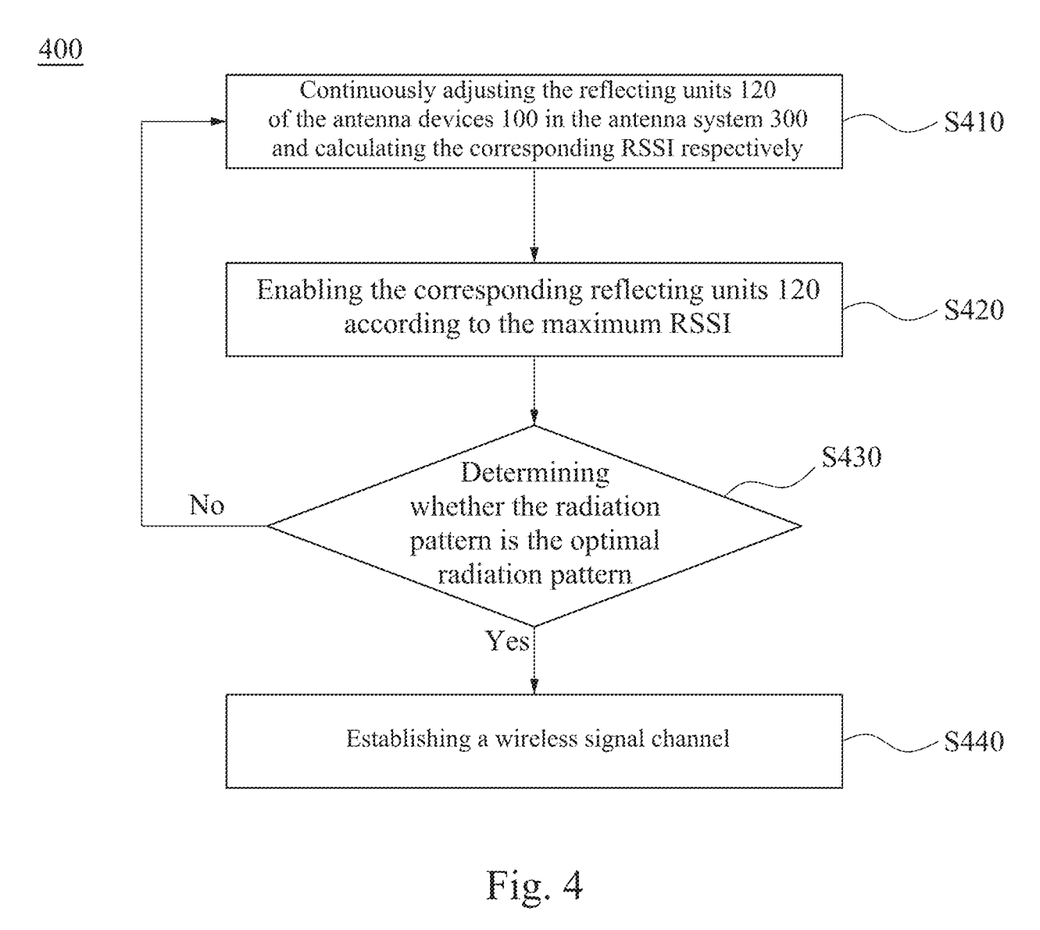
FIG. 4 is a flowchart of an operating method of an antenna system in accordance with one embodiment of the present disclosure.

FIG. 4 is a flowchart of an operating method 400 of the antenna system 300 in accordance with one embodiment of the present disclosure. For the sake of convenience and clarity, the following description is illustrated with reference to FIG. 3 and FIG. 4. As shown in FIG. 3 and FIG. 4, in some embodiments, operation S410 is first executed to continuously adjust the reflecting units 120 of the antenna devices 100 in the antenna system 300 and calculate the corresponding received signal strength indicators (RSSI) respectively. In operation S410, the control circuit 310 controls to turn on the switches 210 and 220 in turn, such that the reflecting units 120 of the antenna devices 100 are respectively connected to the substrate 130 for continuously adjusting the radiation pattern generated by the antenna system 300, and the RSSIs corresponding to different radiation pattern is calculated by a processor (not shown) of the antenna system 300.

In operation S410, the processor (not shown) of the antenna system 300 calculates the RSSIs respectively corresponding to different connection manners (i.e., the manner in which the reflecting units 120 of each of the antenna device 100 are connected to the substrate 130), but the functions of the processor are not limited thereto. The processor (not shown) of the antenna system 300 also may calculate the data rate or the number of spatial streams corresponding to different connection manners, in which various indicators used to represent the data transmission between the antenna system 300 and the target signal source (not shown) are within the scope of the present disclosure.

Operation S420 is then executed to enable the corresponding reflecting units 120 according to the maximum RSSI. In operation S420, the processor (not shown) of the antenna system 300 obtains the connection manner corresponding to the maximum RSSI according to the RSSIs corresponding to different connection manners calculated in operation S410, and transmits a control signal corresponding to this connection manner to the control circuit 310. Thereafter, the control circuit 310 controls to turn on the corresponding ones of the switches 210 and 220 of the antenna devices 100 to connect the corresponding reflecting units 120 to the substrate 130, in order to wirelessly communicate with the target signal source (not shown).

Operation S430 is then executed to determine whether the radiation pattern is the optimal radiation pattern. In operation S430, the processor (not shown) of the antenna system 300 determines whether the radiation pattern is the optimal radiation pattern according to whether the wireless communication is stable between the antenna system 300 and the target signal source (not shown). In some embodiments, a method of using the processor (not shown) of the antenna system 300 to determine whether the wireless communication is stable includes, but not limited to, determining whether the signal transmission is interrupted, whether a message is received before timeout, or whether a negative acknowledgement (NACK) is received. Various methods that can be used to determine whether the wireless communication is stable are within the scope of the present disclosure.

In some embodiments, when the determination result of operation S430 is "yes", operation S440 is executed to establish a wireless signal channel. In operation S440, the antenna system 300 establishes the signal channel according to the reflecting units 120 enabled in the operation S420, thereby performing data transmission.

In some embodiments, when the determination result of the operation S430 is "no", operation S410 is executed to adjust the reflecting units 120 of the antenna devices 100 in the antenna system 300 again and to calculate the corresponding RSSI. Then, operation S420 is executed.

In view of the foregoing, in the present disclosure, the reflecting units 120 with specified shapes are respectively disposed around the antenna unit 110, and are controlled by the control circuit 310 to achieve an optimal radiation pattern, thereby performing the wireless communication with the target signal source (not shown).

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An antenna device, comprising:
    an antenna unit arranged on a substrate; and
    a plurality of reflecting units arranged separately from each other on the substrate, surrounding the antenna unit, wherein the reflecting units are configured to adjust a radiation pattern of the antenna unit, and each of the reflecting units comprising:
    a first portion having an upper side and a lower side; and
    a second portion having a lower side connected to the upper side of the first portion; and
    a first switch coupled to the substrate and the lower side of the first portion;
    wherein the substrate coupled to the lower side of the first portion through the first switch and a width of the lower side of the first portion is smaller than a width of the lower side of the second portion,
    wherein a number of the reflecting units is three, and the antenna unit is arranged on a perpendicular bisector of an edge of an isosceles triangle formed by the reflecting units, and
    wherein a distance between a first reflecting unit of the reflecting units disposed on the perpendicular bisector and the antenna unit is greater than a distance between each of the other two reflecting units of the reflecting units and the antenna unit, and a width of the lower side of the second portion of the first reflecting unit is the largest one of widths of the lower sides of the second portions of the reflecting units.

2. The antenna device of claim 1, wherein the lower side of the second portion connected to the upper side of the first portion through a second switch.

3. The antenna device of claim 2, wherein the angle is in a range from 30 degrees to 60 degrees.

4. The antenna device of claim 1, further comprising:
a plurality of switches configured to couple between the first portion and the second portion of each of the reflecting units, wherein the switches are configured to selectively enable or disable an electrical signal path between the first portion and the second portion of each of the reflecting units to adjust the radiation pattern of the antenna unit.

5. The antenna device of claim 1, wherein a distance between the lower side of the second portion of each of the reflecting units and the substrate is in a range from 0.06 times of a wavelength to 0.2 times of the wavelength.

6. An antenna system, comprising:
a control circuit; and
a plurality of antenna devices coupled to the control circuit, wherein the control circuit is configured to control corresponding radiation patterns of the antenna devices, wherein each of the antenna devices comprises:
a plurality of reflecting units, and each of the reflecting units comprising:
a connecting portion having a first side and a second side opposite to the first side;
a radiation pattern adjusting board having a first side and a second side opposite to the first side, and the first side of the radiation pattern adjusting board connected to the second side of the connecting portion; and
a first switch coupled to a substrate and the first side of the connecting portion, wherein the substrate coupled to the first side of the connecting portion through the first switch and a width of the first side of the connecting portion is smaller than a width of the first side of the radiation pattern adjusting board; and
an antenna unit surrounded by the reflecting units,
wherein a number of the reflecting units is three, and the antenna unit is arranged on a perpendicular bisector of an edge of an isosceles triangle formed by the reflecting units, and
wherein a distance between a first reflecting unit of the reflecting units disposed on the perpendicular bisector and the antenna unit is greater than a distance between each of the other two reflecting units of the reflecting units and the antenna unit, and a width of the first side of the radiation pattern adjusting board of the first reflecting unit is the largest one of widths of the first sides of radiation pattern adjusting boards of the reflecting units.

7. The antenna system of claim 6, wherein the first side of the radiation pattern adjusting board connected to the second side of the connecting portion through a second switch.

8. The antenna system of claim 6, wherein a distance between every two adjacent antenna devices is in a range from 1.3 times of a wavelength to 1.8 times of the wavelength.

9. The antenna system of claim 6, wherein a distance between the first side of the radiation pattern adjusting board of each of the reflecting units and the substrate is in a range from 0.06 times of a wavelength to 0.2 times of the wavelength.

* * * * *